United States Patent
Li et al.

(10) Patent No.: US 8,504,735 B2
(45) Date of Patent: Aug. 6, 2013

(54) OUTPUT SYSTEM AND METHOD FOR RESTORING LOCATION ARRANGEMENT OF OUTPUT DEVICES

(75) Inventors: Hongwei Li, Beijing (CN); Zihua Guo, Beijing (CN); Fei Zhou, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 13/495,217

(22) Filed: Jun. 13, 2012

(65) Prior Publication Data

US 2012/0254471 A1  Oct. 4, 2012

Related U.S. Application Data

(62) Division of application No. 12/648,468, filed on Dec. 29, 2009, now abandoned.

(30) Foreign Application Priority Data

Jan. 4, 2009 (CN) .......................... 2009 1 0076458

(51) Int. Cl.
*G06F 3/00* (2006.01)
(52) U.S. Cl.
USPC ........................................................... 710/3
(58) Field of Classification Search
USPC ........................................................... 710/3
See application file for complete search history.

(56) References Cited

U.S. PATENT DOCUMENTS

| | | | |
|---|---|---|---|
| 7,450,084 B2 * | 11/2008 | Fuller et al. | 345/1.1 |
| 7,570,227 B2 | 8/2009 | MacKinlay | |
| 2010/0064251 A1 | 3/2010 | Hufnagel et al. | |
| 2010/0131691 A1 * | 5/2010 | Chatterjee et al. | 710/303 |
| 2011/0037711 A1 * | 2/2011 | Siddiqui et al. | 345/173 |
| 2011/0047298 A1 * | 2/2011 | Eaton et al. | 710/8 |

FOREIGN PATENT DOCUMENTS

CN 1805541 A 7/2006

OTHER PUBLICATIONS

Application and File history for U.S. Appl. No. 12/648,468, filed Dec. 29, 2009. Inventors: Hongwei Li et al., 120 pages.

* cited by examiner

*Primary Examiner* — Chun-Kuan Lee
(74) *Attorney, Agent, or Firm* — Patterson Thuente Pedersen, P.A.

(57) ABSTRACT

A docking device for restoring location arrangement of output devices is provided according to an aspect of the present invention. The docking device includes a transmission module configured to obtain output information from an information generation module and transmit it to an output device and an identifier storage module configured to store an identifier corresponding to the output device. An output system and method for restoring a location arrangement of output devices are also provided.

10 Claims, 4 Drawing Sheets

| NUMBER | COORDINATE | UNIQUE IDENTIFIER |
|---|---|---|
| 1 | 00 | 1F |
| 2 | 10 | 04 |
| 3 | 01 | A9 |
| 4 | 11 | 68 |

| NUMBER | COORDINATE | UNIQUE IDENTIFIER |
|---|---|---|
| 1 | 00 | 1F |
| 2 | 10 | 04 |
| 3 | 01 | A9 |
| 4 | 11 | 68 |

OUTPUT SYSTEM AND METHOD FOR RESTORING LOCATION ARRANGEMENT OF OUTPUT DEVICES

RELATED APPLICATIONS

This application is a division of application Ser. No. 12/648,468 filed Dec. 29, 2009, which claims priority to Chinese Application No. 200910076458.4 filed Jan. 4, 2009, each of which is incorporated herein in its entirety be reference.

FIELD OF THE INVENTION

The present invention relates to an output system and method for restoring location arrangement of output devices.

BACKGROUND OF THE INVENTION

In the PC field, a plurality of displays are combined to form a larger display desktop, so as to provide many conveniences to a user, especially during occasions such as data analysis and conferences, to facilitate simultaneous display of a plurality of data. An existing notebook or PC is generally provided with one external display interface. However, one external display cannot satisfy these requirements. On the other hand, an external docking device connected via a USB or UWB connection has become an important peripheral in the computer industry. The core function of the docking device is a video function. As USB and UWB can conveniently be connected with a plurality of devices, it has become a new application mode in the field of multi-display to form a larger desktop by connecting a plurality of docking devices. In some configurations, other docking functions can even be removed while the video function remains.

Multi-display can be supported by simply combining a plurality of external docking devices. However, as the order in which the user sequentially inserts the docking connections may be different, it is necessary to rearrange the order of the displays each time they are used, which causes inconvenience. In another common occasion, these external docking devices may be connected to each other by one USB hub or UWB hub. In such a case, the user only has to connect the hub once in order to connect to all of the external docking devices. Even in this case, the order in which the USB enumerates devices may change. Thus, the same problem still exists as the order in which the host enumerates devices after the devices are connected remains different.

Additionally, in other fields such as audio, there is also a need for an output system capable of restoring the arrangement of the devices (e.g., a plurality of speakers with stereo effect which are commonly used in today's home cinema).

SUMMARY OF THE INVENTION

An object of the present invention is to provide an output system and method for restoring location arrangement of output devices capable of automatically restoring connections with a plurality of output devices, such that the operation of combining the devices can be facilitated.

To achieve the above object, according to an aspect of the present invention, an output system for restoring location arrangement of output devices is provided, which comprises: a first output device corresponding to a first identifier; a second output device corresponding to a second identifier; an information generation module configured to generate first output information and second output information which are not identical to each other; a storage module configured to store an interrelationship between the first identifier and the second identifier, the interrelationship representing a location relationship between the first output device and the second output device; and a processing module configured to transmit the first output information to the first output device and transmit the second output information to the second output device based on the interrelationship.

According to another aspect of the present invention, an output method for restoring location arrangement of output devices is provided, which comprises the following steps of: obtaining first output information and second output information which are not identical to each other; obtaining, if available, an interrelationship between a first identifier corresponding to a first output device and a second identifier corresponding to a second output device, the interrelationship representing a location relationship between the first output device and the second output device; and transmitting the first output information to the first output device and transmitting the second output information to the second output device based on the interrelationship.

The interrelationship can be stored in a host in a form of a location mapping table.

When the host does not include the location mapping table, an empty location mapping table is created.

When the host includes the location mapping table and the first identifier or the second identifier is not included in the location mapping table, the host arranges the first output device and the second output device according to a default policy.

The advantageous effect of the present invention is in that there is no need for manually rearranging the order of the output devices each time they are used, thereby greatly enhancing the convenience of connecting the output devices.

BRIEF DESCRIPTION OF THE DRAWINGS

Further understanding of the present invention will be provided with reference to the drawings described herein, which constitute a part of the present application. The illustrative embodiments according to the present invention and the descriptions thereof are intended to explain, rather than limit, the present invention. In the drawings.

DETAILED DESCRIPTION

Figure 1:
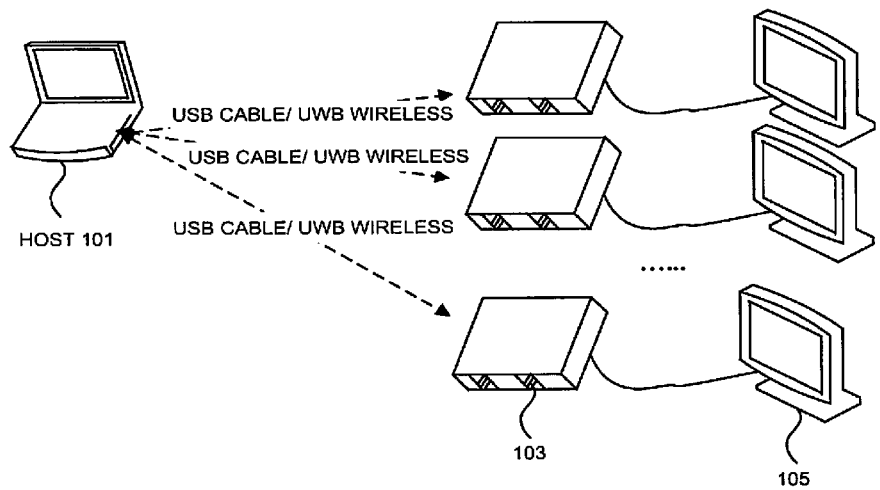
FIG. 1 is an overall schematic diagram of a combined display device according to the prior art.

FIG. 1 is an overall schematic diagram of a combined display device according to the prior art. As shown in FIG. 1, a host 101 can communicate image information via USB or UWB with a plurality of display devices 105, each of which is connected with a docking device 103. To overcome the defects of the prior art, the primary concept of the present invention is to write a unique identifier into the memory of the docking device and to read, arrange, record and restore each unique identifier by hardware and software. In the following, the embodiments of the present invention will be detailed with reference to the drawings.

Figure 2:
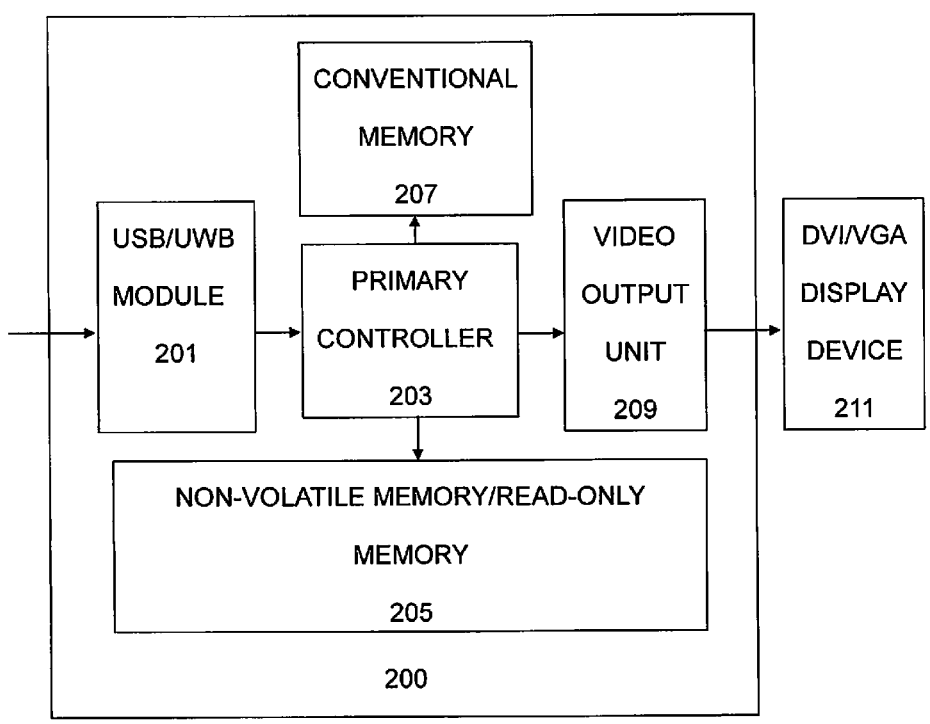
FIG. 2 is a block diagram of the docking device according to the present invention.
Figure 3:
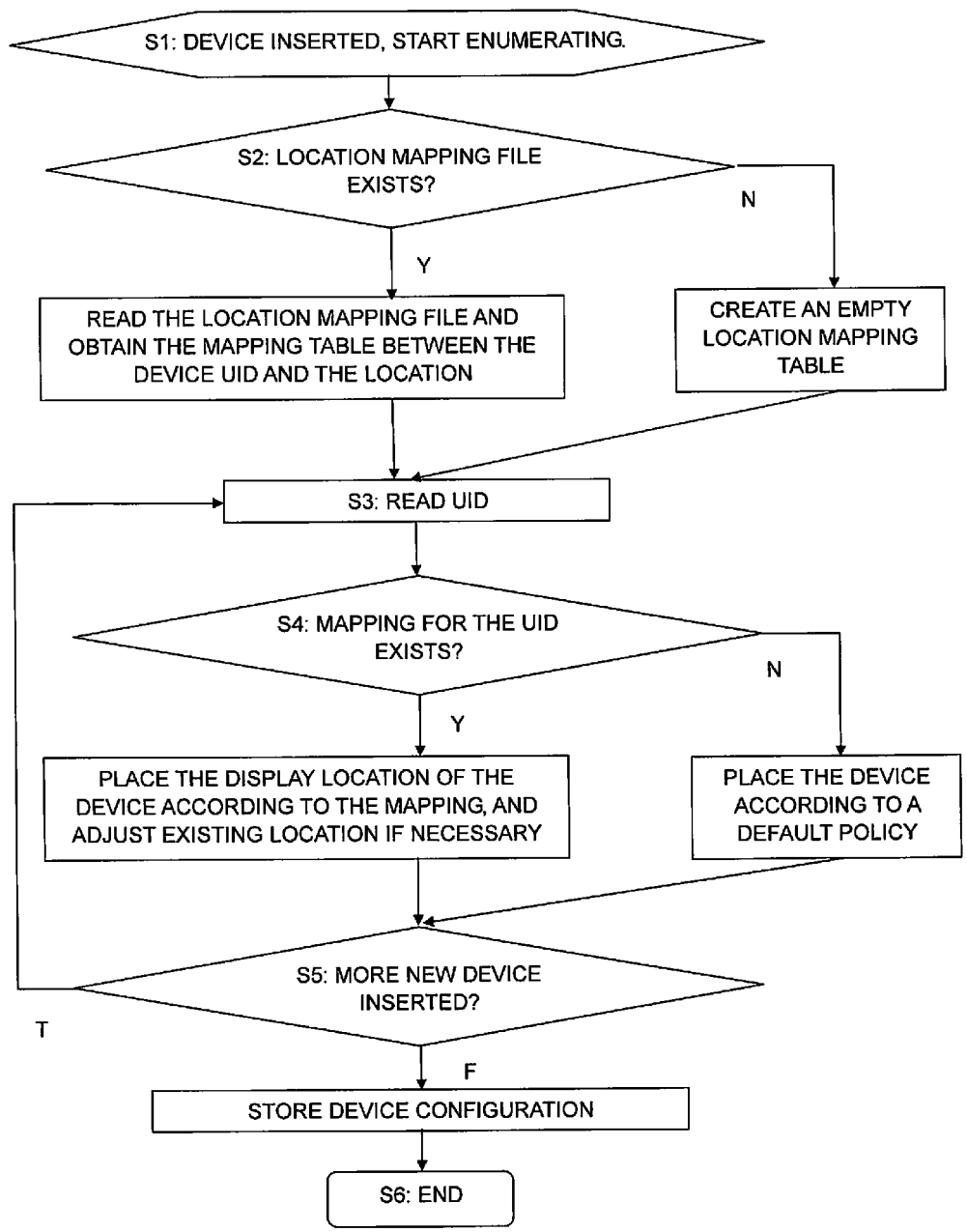
FIG. 3 is a flowchart showing the output method for restoring location arrangement of output devices according to the present invention.
Figures 4, 5:
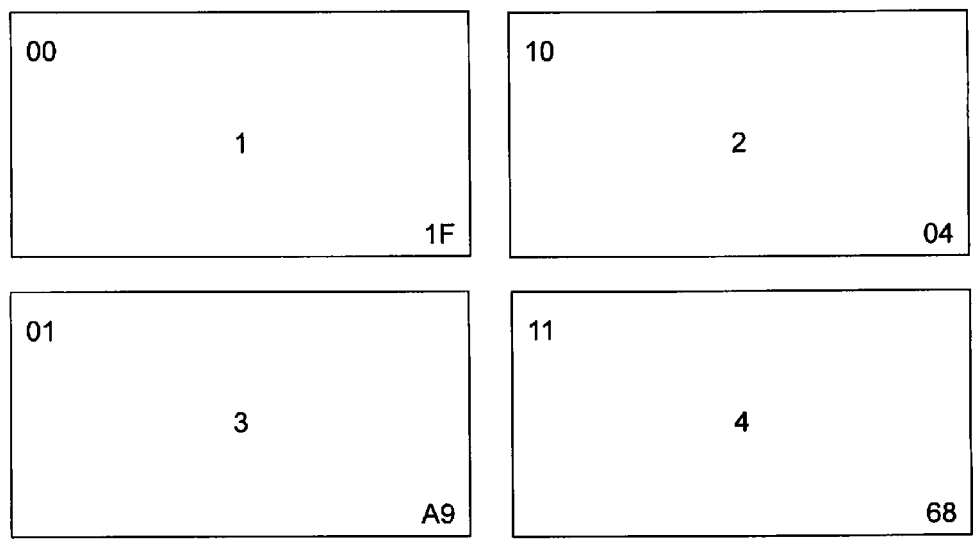
FIG. 4 is a schematic diagram of a 2×2 combined screen according to an exemplary embodiment of the present invention.
FIG. 5 is a schematic diagram of the location mapping table according to an exemplary embodiment of the present invention.

FIG. 2 is a block diagram of a docking device according to the present invention. FIG. 3 is a flowchart showing the method for recording and restoring location arrangement of display device ports according to the present invention. FIG. 4 is a schematic diagram of a 2×2 combined screen according to an exemplary embodiment of the present invention. FIG. 5 is a schematic diagram of the location mapping table according to an exemplary embodiment of the present invention.

As shown in FIG. 2, a port unit USB/UWB module 201 is connected as a port of the docking device 200 to a host 101. A primary controller 203 is connected to the USB/UWB module 201 and configured to process image information from the host, i.e., to distribute partitioned images to respective display devices. A video output unit 209 is connected to the primary controller and configured to output the image information from the primary control unit to the respective display devices. Both a non-volatile memory/read-only memory 205 and a conventional memory 207 within the docking device 200 can be used to store the unique identifier of the docking device 200. Preferably, the non-volatile memory/read-only memory 205 is used to store the unique identifier of the docking device 200.

The unique identifier can be generated by writing with a product line tool during production. In the writing process, it is ensured that the identifier for each docking device is unique. The identifier can be generated based on for example a network MAC (Media Access Control) address to achieve the uniqueness. The MAC address, also referred to as hardware address, is typically used for identification of network cards and is globally unique. However, it will impose a certain requirement on the product line to use such a method to write the unique identifier.

When a docking device having a unique identifier written therein is connected to the host, the host starts to perform the procedure as shown in FIG. 3.

At step 1 (S1), the display devices are enumerated on the host. The enumeration refers to a process in which the host obtains configuration information of the display devices.

At step 2 (S2), it is determined whether there is a location mapping file in the host. When there is a location mapping file, the location mapping file is read to obtain a location mapping table showing the relationship between the locations of the docking and the display devices. If there is no location mapping table, an empty location mapping table is created.

At step 3 (S3), the unique identifier of the docking device is read.

At step 4 (S4), it is determined whether the unique identifier is included in the location mapping table. If the unique identifier is included in the location mapping table, a plurality of display device ports are arranged according to the location mapping table; otherwise, the plurality of display device ports are arranged according to a default policy.

At step 5 (S5), it is determined whether there is another display device connected. If there is another display device connected, the process returns to step 3; otherwise, the location mapping table is stored in the location mapping file.

At step 6 (S6), the process is ended.

The step 4 can be explained in further detail. For example, as shown in FIG. 4, docking devices 1, 2, 3 and 4 of four display devices as illustratively denoted by coordinates 00, 10, 01 and 11 have an illustrative unique identifier 1F, 04, A9 and 68, respectively, as shown in FIG. 5. Now, it is assumed that the host has the location mapping table stored therein. Thus, when the four docking devices having the respective unique identifiers of 1F, 04, A9 and 68 are connected to the host, a host program will sort the four docking devices by using a bubble sort algorithm with reference to the information in the location mapping table. In particular, when the unique identifier 04 is obtained, it will correspond to the coordinate 00 first. Subsequently, when the unique identifier 1F is obtained, it will correspond to the coordinate 00 as it can be determined by looking up the table that the number of 1F is 1, which is prior to the number 2 of the unique identifier 04. Meanwhile, the location of the unique identifier 04 in the table is moved downwards, and so on. If the unique identifier of the docking device (e.g., 84, 17, 63 . . . ) is not included in the location mapping table, these display devices will be arranged horizontally from left to right according to a default policy. In this case, the illustrative coordinates at which the display devices are located can be 00, 10, 20 . . . .

In a second embodiment, the four docking devices in the first embodiment can be replaced with one docking device with four display processing chips integrated therein. Each display processing chip is connected with its respective identifier memory. In particular, as shown in FIG. 4, the docking device (with identifier memories 1, 2, 3 and 4 integrated therein) of four display devices as illustratively denoted by coordinates 00, 10, 01 and 11 has an illustrative unique identifier 1F, 04, A9 and 68, respectively, as shown in FIG. 5. The docking device is connected to the host and configured to receive image signals partitioned by the host and distribute the partitioned signals to each display processing chip which then processes the signals and transmits them to the respective display devices. It is assumed that the host has the location mapping table stored therein. Thus, when the display processing chips corresponding to the four identifier storage chips having the respective unique identifiers of 1F, 04, A9 and 68 are connected to the host via the docking device, a host program will sort the identifiers in the four identifier storage chips by using a bubble sort algorithm with reference to the information in the location mapping table. In particular, when the unique identifier 04 is obtained, it will correspond to the coordinate 00 first. Subsequently, when the unique identifier 1F is obtained, it will correspond to the coordinate 00 as it can be determined by looking up the table that the number of 1F is 1, which is prior to the number 2 of the unique identifier 04. Meanwhile, the location of the unique identifier 04 in the table is moved downwards, and so on. If the unique identifier in the identifier storage chip (e.g., 84, 17, 63 . . . ) is not included in the location mapping table, these display devices will be arranged horizontally from left to right according to a default policy. In this case, the illustrative coordinates at which the display devices are located can be 00, 10, 20 . . . .

In a third embodiment, a port unit USB/UWB module 201 is connected as a port of the docking device 200 to a host 101. A primary controller 203 is connected to the USB/UWB module 201 and configured to process image information from the host, i.e., to partition the image from the host and distribute partitioned images to respective display devices. A video output unit 209 is connected to the primary controller and configured to output the image information from the primary control unit to the respective display devices. Both a non-volatile memory/read-only memory 205 and a conventional memory 207 within the docking device 200 can be used to store the unique identifier of the docking device 200. Preferably, the conventional memory 207 is used to store the unique identifier of the docking device 200.

The unique identifier can be generated in the following way. When using this docking device for the first time, the unique identifier is generated by means of time stamp plus network card MAC address of the host and written into the non-volatile memory/read-only memory 205 and the conventional memory 207 of the docking device. Afterwards, the process in which the host obtains and sorts the unique identifier of the docking device is the same as that of the first embodiment, whose description can be omitted here.

In a fourth embodiment, the unique identifier can also be generated in the following way. When this docking device is used for the first time, the UUID (Universally Unique Identifier) generation method in OSF can be referenced if there is no host network card. The UUID used in OSF is mainly used to identify two parties in a remote process invoked communication. Generally, it is ensured that all machines in a same time-space domain are unique, such that the uniqueness can be ensured.

In addition, in a fifth embodiment when the connection state of the docking device remains unchanged and the actual placing locations of a plurality of display devices are changed, an unreasonable combination of a plurality of images is still possible. At this time, the display devices on an interface provided by the host Window system can be manually arranged on the interface according to the actual placing locations first. The above operations will be performed when the arrangement on the interface is the same as the actual situation. The detailed description of the operations is similar to that described above.

In a sixth embodiment, the output system for restoring location arrangement of output devices according to the above embodiment is applicable to the audio field. For example, this system can be applied when arranging surround stereo speakers.

In summary, an intelligent distribution of image information to respective portions of a combined screen can be fully achieved by obtaining the respective unique identifiers of the docking devices and by arranging, recording and restoring them, thereby obtaining an effect of reducing time and effort.

The foregoing is only description of the embodiments of the present invention and is not intended to limit the present invention. One skilled in the art can make various modifications and changes to the present invention. Any modification, equivalent alternative and improvement, as long as belonging to the general concept of the present invention, should be encompassed by the scope of the present invention as defined in the following claims.

The invention claimed is:

1. An output system for restoring physical location arrangement of output devices, comprising:
    a first output device corresponding to a first identifier of a first docking device;
    a second output device corresponding to a second identifier of a second docking device;
    an information generation module generating first output information and second output information which are not identical with each other;
    a storage module storing a mapping between the first and second identifiers and locations of the first and second output devices, the mapping specifying the physical location arrangement of the first output device and the second output device; and
    a processing module obtaining, when the first and second docking devices are connected to the output system, the mapping and transmit the first and second output information based on the mapping, such that the first output device receives the first output information via the first docking device and the second output device receives the second output information via the second docking device, and the physical location arrangement of the output devices is restored accordingly;
    wherein the first identifier and the second identifier are included in a first identifier storage module and a second identifier storage module respectively within one of the first and second docking devices.

2. The output system for restoring physical location arrangement of output devices according to claim 1, wherein the first output device is a first display device, the second output device is a second display device, and the information generation module is a host.

3. The output system for restoring physical location arrangement of output devices according to claim 2, wherein the mapping is stored in the host in a form of a location mapping table.

4. The output system for restoring physical location arrangement of output devices according to claim 3, further comprising a mapping table creation module configured to create, when the host does not include the location mapping table, an empty location mapping table.

5. The output system for restoring physical location arrangement of output devices according to claim 1, wherein the first identifier and the second identifier are both written according to MAC address.

6. An output method for restoring physical location arrangement of output devices, comprising the following steps of:
    obtaining, from an information generation module, first output information and second output information which are not identical with each other;
    when a first docking device having a first identifier and a second docking device having a second identifier are connected to the information generation module, obtaining a mapping between the first and second identifiers and locations of a first output device and a second output device, the first output device corresponding to the first identifier of the first docking device, and the second output device corresponding to the second identifier of the second docking device wherein the mapping specifies the physical location arrangement of the first output device and the second output device; and
    transmitting the first and second output information based on the mapping, such that the first output device receives the first output information via the first docking device, and the second output device receives the second output information via the second docking device, and the physical location arrangement of the output devices is restored accordingly;
    wherein the first identifier and the second identifier are included in a first identifier storage module and a second identifier storage module respectively, within one of the first and second docking devices.

7. The output method for restoring physical location arrangement of output devices according to claim 6, wherein the mapping is stored in a host in a form of a location mapping table.

8. The output method for restoring physical location arrangement of output devices according to claim 7, further comprising: creating, when the host does not include the location mapping table, an empty location mapping table.

9. A docking device for restoring physical location arrangement of output devices, comprising:
    a transmission module obtaining one of a plurality of output information from an information generation module and transmit one of the plurality of output information to a corresponding one of the output devices; and
    a plurality of identifier storage modules configured to store a plurality of identifiers of different docking devices including the docking device;

wherein each identifier of the docking devices corresponds to each one of the output devices respectively, wherein there is a mapping between the identifiers and locations of the output devices, the mapping specifying the physical location arrangement of the output devices, and the transmission module transmits the obtained one of the plurality of output information based on the mapping such that the obtained one of the plurality of output information is received by the corresponding one of the output devices, and the physical location arrangement of the output devices is restored accordingly.

10. The docking device for restoring physical location arrangement of output devices according to claim 9, wherein the information generation module is a host, the output device is a display device, and the docking device is connected between the host and the display device.

* * * * *